US005706564A

United States Patent [19]

Rhyne

[11] Patent Number: 5,706,564

[45] Date of Patent: Jan. 13, 1998

[54] METHOD FOR DESIGNING ULTRASONIC TRANSDUCERS USING CONSTRAINTS ON FEASIBILITY AND TRANSITIONAL BUTTERWORTH-THOMPSON SPECTRUM

[75] Inventor: Theodore Lauer Rhyne, Whitefish Bay, Wis.

[73] Assignee: General Electric Company, Milwaukee, Wis.

[21] Appl. No.: 724,093

[22] Filed: Sep. 30, 1996

Related U.S. Application Data

[63] Continuation of Ser. No. 507,895, Jul. 27, 1995, abandoned.

[51] Int. Cl.$^6$ .................... H02K 41/04

[52] U.S. Cl. .................... 29/25.35; 310/327; 310/334

[58] Field of Search .................... 310/311, 326, 310/327, 334–336; 29/25.35

[56] References Cited

U.S. PATENT DOCUMENTS

| | | | |
|---|---|---|---|
| 4,366,406 | 12/1982 | Smith et al. | 310/334 |
| 4,680,499 | 7/1987 | Umemura et al. | 310/334 |
| 4,771,205 | 9/1988 | Mequio | 310/334 |
| 4,795,935 | 1/1989 | Fujii et al. | 310/336 |
| 5,196,811 | 3/1993 | Anderson | 331/135 |
| 5,389,848 | 2/1995 | Trzaskos | 310/334 |

OTHER PUBLICATIONS

Peless et al., "Analysis and Synthesis of Transitional Butterworth–Thompson Filters and Bandpass Amplifiers", RCA Review, Mar. 1957, pp. 60–94.

*Primary Examiner*—Thomas M. Dougherty

*Attorney, Agent, or Firm*—Dennis M. Flaherty; John H. Pilarski

[57] ABSTRACT

A method for designing ultrasonic transducers used in diagnostic ultrasonic imagers, in particular, transducers made up of at least one piezoelectric layer and at least one acoustic matching layer, plus various bonding and backing layers. The method of transducer design uses a particular family of spectra as the basis of the bandpass characteristic. The approach is to specify a transfer function from the Transitional Butterworth Thompson family of spectra. The specification is influenced by trade-offs in bandwidth, transient response and design feasibility. This family is indexed by a design parameter called M. Using the M factor, a designer can more readily make the engineering trade-offs needed. By adjusting this parameter, any dynamic response from maximally flat to Gaussian can be obtained. Since not all possible members of this spectral family are feasible as transducers, a design space (bandwidth versus band shape) is used to systematically represent the engineering trade-offs and to graphically represent the physical constraints on feasibility.

4 Claims, 6 Drawing Sheets

METHOD FOR DESIGNING ULTRASONIC TRANSDUCERS USING CONSTRAINTS ON FEASIBILITY AND TRANSITIONAL BUTTERWORTH-THOMPSON SPECTRUM

This is a continuation of application Ser. No. 08/507,895 filed on Jul. 27, 1995 now abandoned.

FIELD OF THE INVENTION

This invention generally relates to ultrasonic transducers comprising piezoelectric elements sandwiched between backing/matching layers. In particular, the invention relates to a method for designing ultrasonic transducers having a desired transfer function.

BACKGROUND OF THE INVENTION

Conventional ultrasonic transducers for medical applications are constructed from one or more piezoelectric elements sandwiched between backing/matching layers. Such piezoelectric elements are constructed in the shape of plates or rectangular beams bonded to the backing and matching layers. The piezoelectric material is typically lead zirconate titanate (PZT), polyvinylidene difluoride (PVDF), or PZT ceramic/polymer composite.

Almost all conventional transducers use some variation of the geometry shown in FIG. 1. The basic ultrasonic transducer 2 consists of layers of materials, at least one of which is a piezoelectric plate 4 coupled to a pair of electric terminals 6 and 8. The electric terminals are connected to an electrical source having an impedance $Z_s$. When a voltage waveform v(t) is developed across the terminals, the material of the piezoelectric element compresses/expands at a frequency corresponding to that of the applied voltage, thereby emitting an ultrasonic wave into the media to which the piezoelectric element is coupled. Conversely, when an ultrasonic wave impinges on the material of the piezoelectric element, the latter produces a corresponding voltage across its terminals and the associated electrical load component of the electrical source.

Typically, the front surface of piezoelectric element 4 is bonded to one or more acoustic matching layers or windows (e.g., 12 and 14) that improve the coupling with the media 16 in which the emitted ultrasonic waves will propagate. In addition, a backing layer 10 is bonded to the rear surface of the piezoelectric element 4 to absorb ultrasonic waves that emerge from the back side of the element so that they will not be partially reflected and interfere with the ultrasonic waves propagating in the forward direction.

The basic principle of operation of such conventional transducers is that the piezoelectric element radiates respective ultrasonic waves of identical shape but reverse polarity from its back surface 18 and front surface 20. These waves are indicated in FIG. 1 by the functions $P_b(t)$ and $P_f(t)$ for the back and front surfaces respectively. A transducer is said to be half-wave resonant when the two waves constructively interfere at the front face 20, i.e., the thickness of the piezoelectric plate equals one-half of the ultrasonic wavelength. The half-wave frequency $f_0$ is the practical band center of most transducers. At frequencies lower than the half-wave resonance, the two waves interfere destructively so that there is progressively less and less acoustic response as the frequency approaches zero. Conversely, for frequencies above the half-wave resonance there are successive destructive interferences at $2f_0$ and every subsequent even multiple of $f_0$. Also, there are constructive interferences at every frequency which is an odd multiple of $f_0$. The full dynamics of the transducer of FIG. 1 involve taking into account the impedances of each layer and the subsequent reflection and transmission coefficients. The dynamics of the transducer are tuned by adjusting the thicknesses and impedances of the layers. The conventional piezoelectric element has very thin boundaries and launches waves of opposite polarity from front and back faces.

SUMMARY OF THE INVENTION

The present invention is a method for designing ultrasonic transducers used in diagnostic ultrasonic imagers. Such ultrasonic transducers are made up of one piezoelectric layer and two or more matching layers, plus various bonding and backing layers.

Transducer design is critical to the B mode image quality and Doppler/color flow sensitivity performance of imaging systems. A central problem is trading-off the bandwidth characteristics of the transducer against the impulse response characteristics. This problem is compounded by the difficulty in implementing the desired design and by the physical feasibility of achieving the desired time/frequency response.

Recently in the field of ultrasonic transducer design, much emphasis has been placed on the importance of transducer transient shape and its effect on B-Mode contrast resolution. An approach to the engineering design of transducers is disclosed wherein the designer may trade off transient response properties against signal bandwidth while satisfying physical feasibility. The present invention is a method for designing ultrasonic transducers using a particular family of spectra as the basis of the bandpass characteristic. The approach is to specify a transfer function from the Transitional Butterworth-Thompson family of spectra. The specification is influenced by trade-offs in bandwidth, transient response and design feasibility. This family is well-known in electrical engineering but has not been applied to ultrasonic transducers. This family is indexed by a design parameter called M. Using the M factor, a designer can more readily make the engineering trade-offs needed. By adjusting this parameter, any dynamic response from maximally flat (Butterworth) to Bessel/Thompson (Gaussian) can be obtained. Since not all possible members of this spectral family are feasible as transducers, a design space (bandwidth versus band shape) was invented to systematically represent the engineering trade-offs and to graphically represent the physical constraints on feasibility.

DETAILED DESCRIPTION OF THE PREFERRED EMBODIMENTS

The physics of transducers forces them to have a bandpass dynamic that is described by a few poles. In fact, for a single transducing element and N windows there are as many as N+1 poles, or in the case of one PZT layer and two matching layers, there are three poles. The design process of the present invention uses a synthesis method that begins by specifying the shape of the transfer function. From this, a gradient search method is used to adjust the matching layer thicknesses and impedances until the specified transfer function is achieved, within an error. The transducer's impulse response is the Fourier inverse of the transfer function that is specified. This process is optimum in that it produces the least error in fitting the specified transfer function, but the designer needs to guess a "good" shape for the transfer function. What makes a "good" shape is when the physics of the transducer permit the optimization process with a small error. Most importantly, of the "good" shapes permitted by the physics, the designer needs to pick a transfer function with good band coverage and an impulse response with a time shape that preserves the contrast resolution.

The present invention addresses how to pick a desirable transfer function and what the range of choices is. More specifically, a systematic exploration is sought of the design space of all transducers that could be designed with one PZT layer and two matching windows. Moreover, the design space should describe the most important spectral and temporal properties of transducers. The design space in accordance with the present invention is bandwidth versus band shape. The bandwidth dimension is the −6 dB fractional bandwidth. The band shape dimension allows one to select the spectral shape and the transducer impulse response. Each possible transducer occupies a point in this design space. The physical limitations of the transducers limit the possibilities by making the optimization error unacceptably high in certain regions of the design space. So the design possibilities can be summarized by plotting error contours in the design space. This design space with its error contours (for a given element area, backing loss, PZT material and matching layers) is the basis of a rational design process.

Figure 2:
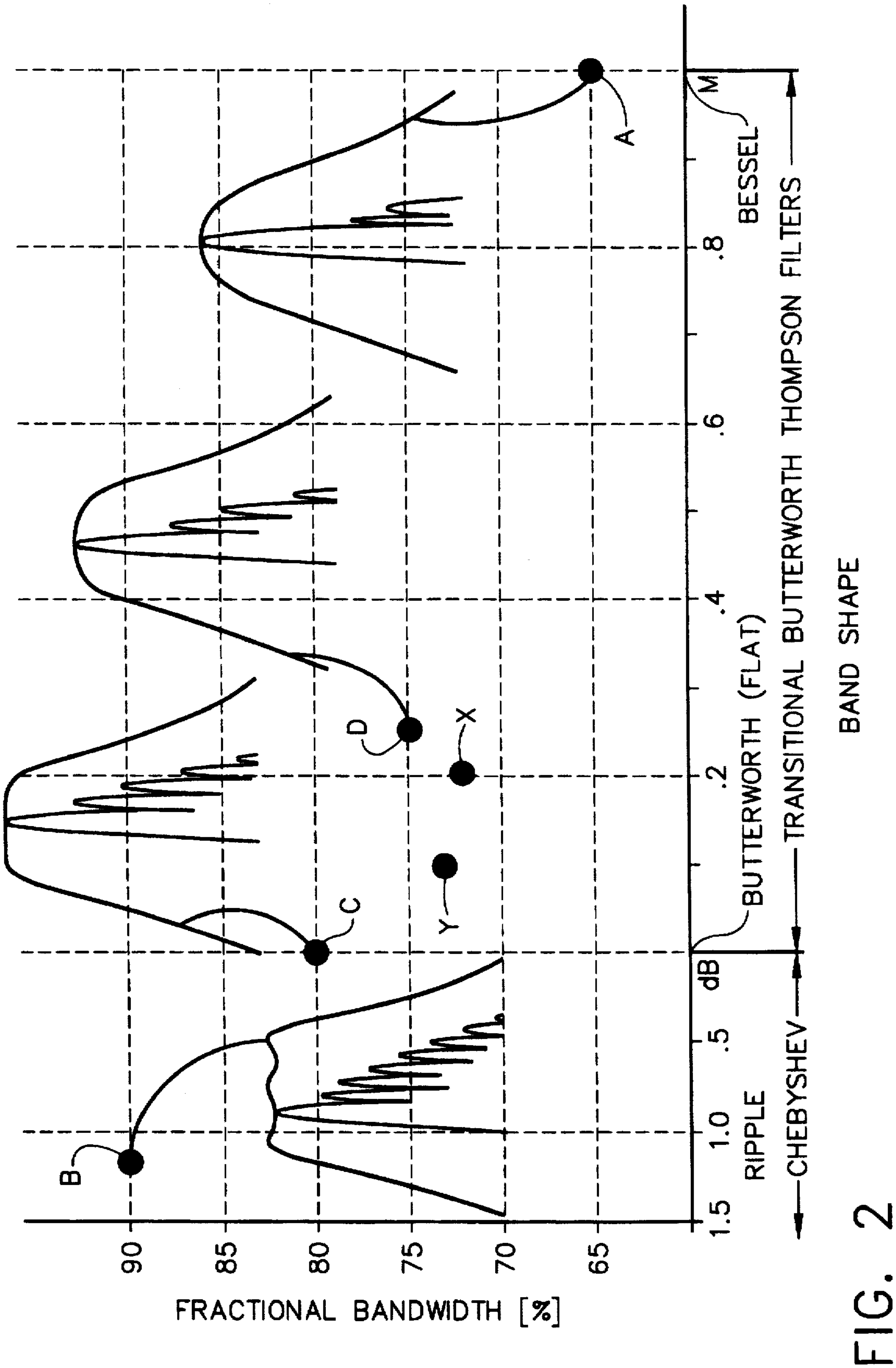
FIG. 2 is a diagram showing the design space consisting of bandwidth and band shape in accordance with the invention, showing examples of transfer functions and impulse responses for several design points in the space.

The key to the design process lies in understanding the band shape dimension of the design space seen in FIG. 2. The band shape dimension at one extreme is defined by the Thompson (Gaussian) filter. This is the Gaussian-like shape seen associated with design point A in the design space. At the extreme left of the design space the band shape dimension is defined by a Chebyshev filter. This is the rippled, flat-band shape seen associated with design point B in the upper left of the design space. Moving from the Chebyshev filter to the right in the design space, the ripple decreases until a maximally flat shape is achieved, which is the Butterworth filter. A Butterworth filter is shown for a point C in the design space. Moving farther to the right in the design space, the band becomes progressively more dome-shaped. This is the Transitional Butterworth Thompson filter, associated with point D in the design space. By adjusting the M factor (on the axis of the design space) from zero to unity, the Transitional Butterworth-Thompson filter moves from the Butterworth to the Bessel/Thompson shapes. There is one example of a spectrum shown for M=0.25 at point D.

The bandwidth dimension of the design space simply widens or narrows a given band shape. It also shortens or lengthens the transducer impulse response, in inverse proportion. Four different band shapes are shown in FIG. 2 along with their impulse responses. All are plotted in dB over a 50-dB range, and all have consistent scale factors (so that they can be compared visually). As can be seen, the flat-band shapes to the left of the design space have more usable bandwidth but their impulse responses have more numerous and higher side lobes. Also, moving upward within the diagram increases bandwidth and reduces the time scale of the response. For a given fractional bandwidth, the trade-off in a transducer design is between usable bandwidth and transient side lobes. Preferably, the designer would like to have all the bandwidth that the physics makes possible. The diagram shown in FIG. 2 is a workable tool for making these trade-offs provided that the designer knows what regions of the diagram that the physics will let him operate within.

For the design space consisting of bandwidth and band shape, the designer needs to know what regions of the design space are feasible for transducer design. Simulation design tools are used to design transducers by specifying a bandwidth/band shape and then optimizing (by steepest descent gradient search) the parameters of the various layers of the transducer to best fit the specified shape. The design tools provide a "goodness of fit" which is the average dB error over the specified band shape. For example, good fit has an average error of 0.02 dB. Conversely, less good fit would be 0.2 dB.

Figure 3:
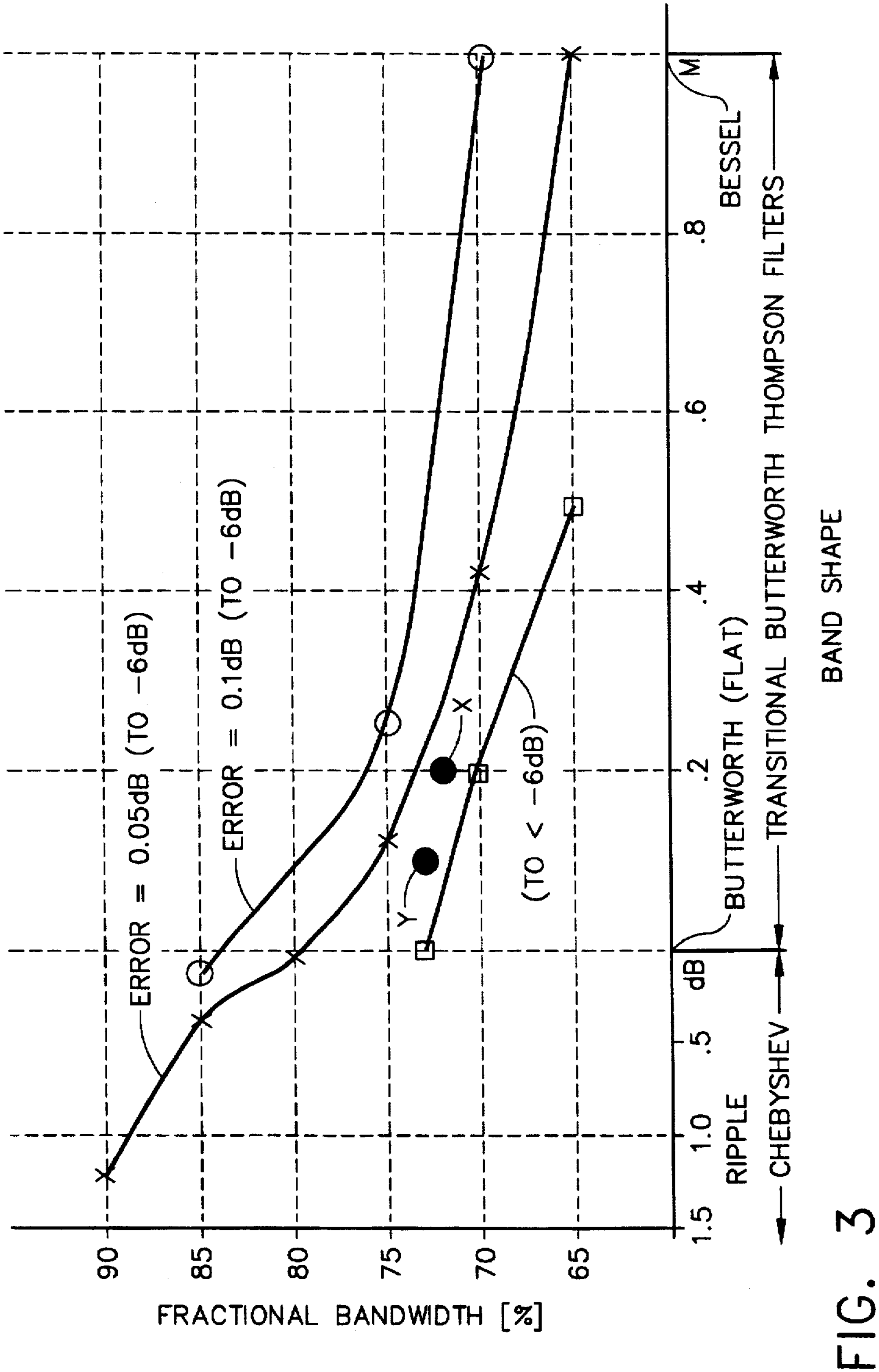
FIG. 3 is a diagram showing regions of the design space where feasible transducers are made possible by the physical constraints on transducer synthesis error.

If a large number of transducers are synthesized for a number of points in the design space using the bandwidth and band shape values. Then the goodness-of-fit error values may be plotted at these points in the design space. By connecting points with equal error, the error contours for this class of transducer are obtained (e.g., in FIG. 2 the class having one PZT layer, two matching windows, bond lines, lens, material properties, etc,). Two error contours are shown in FIG. 3 for two error levels, as indicated. For design points to the left of the 0.1 dB contour, transducers can be built that very closely match the specified bandwidth and band shape. For points to the right of this contour, the error becomes large and the design is not well controlled. A third contour is given which indicates the region in which even greater goodness of fit may be achieved. Both contours fit the target function to the −6 dB level, indicating that the actual transfer function departs from the specified function below −6 dB. The third contour provided has no specified error value (in fact, the errors are less than 0.05 dB). This contour indicates designs that match the specified band shape to levels substantially below −6 dB. The three contours of FIG. 3 clearly indicate where feasible transducer designs are possible and provide some indication of the quality of the potential design. As can be seen in FIG. 3, the design point X for one transducer was placed in a design region somewhat to the right of the design point Y for another transducer (for better transient shape).

The radiation efficiency and reception sensitivity are properties of the nominal design parameters of the transducer which include: area, PZT material and layering configuration (e.g., one PZT and two matching layers). A nominal design will have a given set of design space error contours. In general, the contours of FIG. 3 do not shift significantly for different band-center frequencies which may be achieved by thickness scaling the mechanical layers. There is an improvement in bandwidth (contours shift upward), radiation efficiency and noise figure for a larger-area element, as well as other methods of improving the electrical match.

In view of the above-described design space and error contours, a methodology can be described for transducer design. The transducer design in accordance with the present invention comprises the step of specifying a "target" transfer function, which equivalently specifies the transient response as well. The "target" function is selected from the family of Transitional Butterworth-Thompson (TBT) transfer functions. These functions are indexed on a factor M. For a value of M=0, the function becomes the maximally flat or Butterworth spectrum. For a value of M=1, the function becomes the Bessel or Thompson polynomial, which is a well-known approximation to a Gaussian function.

The "target" TBT function is also indexed on the bandwidth scale expressed as a fractional bandwidth relative to band center. The selection of a bandwidth and the factor M completely specifies the transfer function and transient response. Engineering trade-offs for bandpass and transient response shape are made using tables and/or plots of the TBT function and transient response resulting in the selected bandwidth and M factor. Engineering selection of the bandwidth and M factor also consider the feasibility of the design as indicated by a design space diagram such as the exemplary diagram show in FIG. 3.

After selecting a "target" transfer function, computer optimization is utilized to adjust the layers of the transducer to achieve the "target" transfer function by minimizing the error of fit. Computer optimization utilizes any of various standard optimizing algorithms. One such optimizing algorithm is the steepest descent gradient search method. For example, for the transducer indicated by design point X in FIG. 3, the specifications were as follows: M=0.2; fractional bandwidth 73%; expected error 0.04 dB (to −6 dB).

For calculation of transducer transfer function, the fundamental model of a piezoelectric plate transducer is that disclosed by Mason [W. P. Mason, Electronical Transducers and Wave Filters, Van Nostrand, N.Y. (1948)], wherein a piezoelectric plate is poled through the thickness of the plate and electrical terminals are attached as thin conductive layers on both faces. The plate may be acoustically loaded on either or both of the two faces. A very important application arises when the plate is operated near its half-wave resonance. There are several well-known models that are interpretations of the fundamental Mason model. A significant model is due to Redwood [M. Redwood, "Transient Performance of a Piezoelectric Transducer", J. Acoust. Soc. Am., Vol. 33, No. 4, pp. 527–536, April (1961)], where an electrical delay line analog is driven at its shield by an electrical terminal pair transformed by the electromechanical transformer. Acoustic loads are connected between ground and center lead at either end of the electrical line. This model correctly interprets the waves as arising at the ends of the electrical analog line. The KLM model [R. Krimholtz, D. A. Leedom and G. L. Mathaei, "New Equivalent Circuits for Elementary Piezoelectric Transducers," Electron. Lett., Vol. 6, No. 13, pp. 398–399, Jun. 5 (1970)] is a circuit equivalent to the Mason model, which uses two transmission lines of ¼ wavelength, and appears to represent the waves as arising from the center of the two transmission lines. The lumped element model [T. L. Rhyne, "An Improved Interpretation of Mason's Model for Piezoelectric Plate Transducers", IEEE Trans. Sonic. & Ultrason., Vol. SU-25, No. 2, pp. 98–103, March (1978)] is a circuit equivalent to the Mason model, where the transmission lines have been decomposed into lumped elements with transcendental functions, which readily factor into series and parallel resonators. This model is useful near the half-wave resonance of the plate, and correctly demonstrates that the two acoustic loads appear in a series connection.

An important class of transducer consists of a piezoelectric plate loaded on one face to a water-like acoustic media through interposed matching layers, and loaded on the other face to a backing material. Since most practical piezoelectric materials (e.g., PZT) have a specific acoustic impedance which is relatively higher than that of water, the function of the matching layers is to provide an impedance transformation between the water-like media and the piezoelectric plate. Indeed, matching layers of suitable impedance, operating at ¼ wavelength, are well known to demonstrate the desired impedance transformation, for that precise frequency.

Many methods for the design of transducer transfer functions have been advanced which specify the choice of impedances and thicknesses for the layers. Most techniques utilize circuit theory concepts, such as insertion-loss filter design, wherein the transducer is viewed as a linear passive reactive device which interconnects a resistive source with a radiation load plus other losses. The most fundamental designs utilize single and double matching layers together with a low-loss backing. The various methods of synthesis are based upon analysis of vibrational modes and the use of image parameter theory.

Unfortunately, ultrasonic transducer construction is more complex than the structure that the foregoing design methods address. Practical transducer designs require additional layers representing bonding and metallization that are interposed among the various matching layers plus layers repesenting lenses. The application of computer optimization to transducer design offers the opportunity to manage the complexity of design optimization while achieving a desired transducer transfer function or impulse response. Algorithmic optimization consists of selecting transducer paramters so as to achieve a desired optimization criteria. However, the underlying dynamics of the electromechanical network impose constraints on the universe of possible optimizations and their criteria. The approach adopted herein combines computer optimization with insights into the fundamental dynamics.

Figure 1:
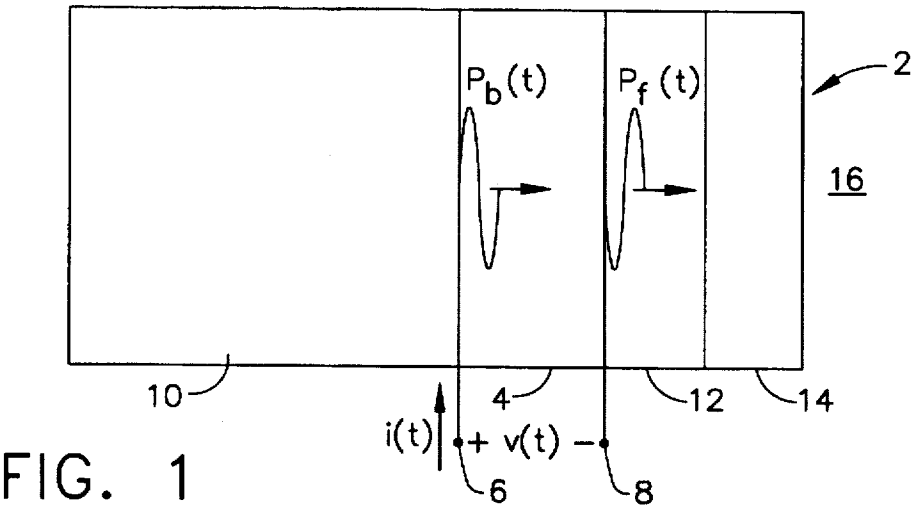
FIG. 1 is a schematic showing the basic structure of a conventional ultrasonic transducer.
Figure 4:
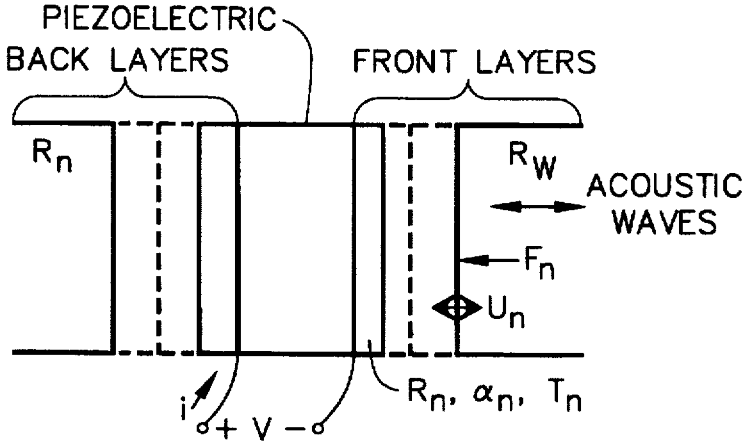
FIG. 4 is a schematic showing a transducer with a piezoelectric plate acoustically coupled on its front and back faces to multiple acoustic layers ending in half spaces, and electrically coupled to a terminal pair formed by conductive plates on the piezoelectric layer.

The transducer to be discussed is shown in FIG. 4, with a piezoelectric plate acoustically coupled on its "front" and "back" faces to multiple acoustic layers ending in half spaces, and electrically coupled to a terminal pair formed by conductive plates on the piezoelectric layer. The transducer is electrically excited through the terminal pair, radiates waves from the front acoustic structure, receives acoustic waves at the front, and observes the waves in an electrical network connected to the electrical terminals.

The operation of the transducer is analyzed using equivalent electromechanical circuit models for the transducer and the electrical network. The fundamental model for a piezoelectric plate transducer is the Mason model given in:

$$\begin{bmatrix} F_1 \\ F_2 \\ V \end{bmatrix} = \begin{bmatrix} AR_c\frac{Z^2+e^{-2\alpha}}{Z^2-e^{-2\alpha}} & 2AR_c\frac{Ze^{-\alpha}}{Z^2-e^{-2\alpha}} & \frac{h}{j\omega} \\ 2AR_c\frac{Ze^{-\alpha}}{Z^2-e^{-2\alpha}} & AR_c\frac{Z^2+e^{-2\alpha}}{Z^2-e^{-2\alpha}} & \frac{h}{j\omega} \\ \frac{h}{j\omega} & \frac{h}{j\omega} & \frac{b}{A\epsilon^S j\omega}+R_0 \end{bmatrix} \begin{bmatrix} U_1 \\ U_2 \\ i \end{bmatrix}, \quad (1)$$

where $F_1$, $F_2$ are the forces on the faces; $U_1$, $U_2$ are the velocities of the faces; Z is the time shift operator exp(jT); ω is the radian frequency; T is the transit time across the plate; $R_c$ is the specific acoustic impedance of the plate; A is the area of the plate; $\epsilon^S$ is the dielectric constant at fixed strain; b is the thickness of the plate; $V^D$ is the velocity at constant displacement; $C_0$ is the capacitance at constant strain ($C_0=\epsilon^S A/b$); $K_T$ is the piezoelectric coupling constant (transversely clamped); h is the electrostrictive mechanical coupling coefficient of the plate ($h=K_T V^D R_c C_0 b$); V is the electrical voltage; i is the current; j is the imaginary number; α is the one-way loss (which may be a function of frequency); and $R_0$ is the dielectric loss resistance (which may be a function of frequency).

The piezoelectric plate possesses two mechanical ports and one electrical port. The front and back faces of the piezoelectric plate are fully described by the mechanical terminal variables of velocity and force, U and F, while the electrical terminals are fully described by the voltage and current, V and i. The upper left square in the matrix can be interpreted as an acoustic transmission line; the lower right entry represents the series reactance of a capacitance plus a resistance. Piezoelectric coupling is expressed by the electrostrictive mechanical coupling coefficient h in the cross-terms. The form of Eq. (1) is identical to that of the Rhyne reference with the addition of loss to the acoustic transmission line and dielectric loss to the static capacitance.

Figure 5:
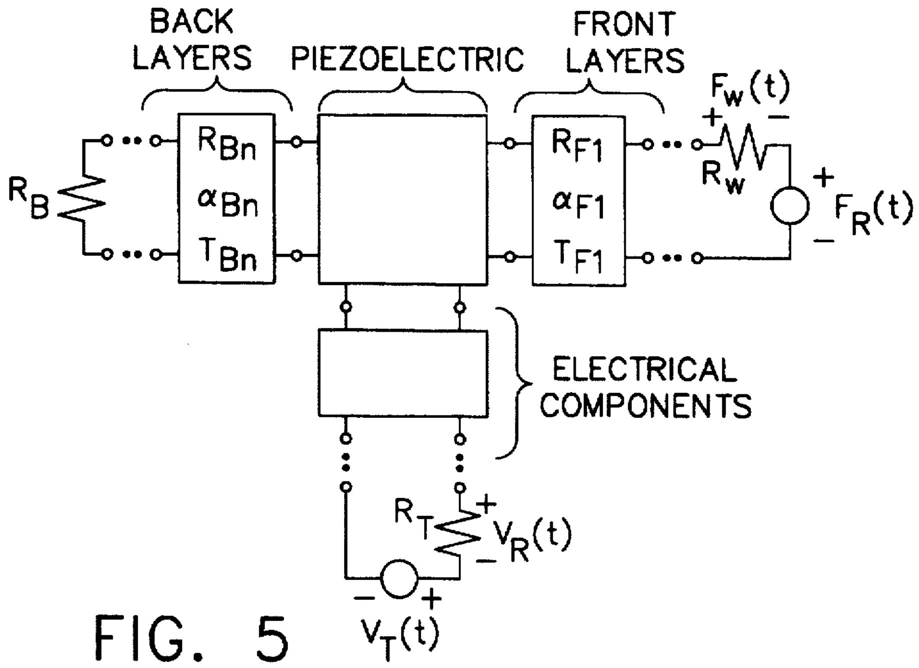
FIG. 5 is a schematic showing an equivalent electromechanical circuit model for the piezoelectric plate transducer and electrical network depicted in FIG. 4.

The Mason model may be readily interconnected with acoustic and electrical loads to complete the transducer model. The transducer is constrained to have multiple plates of the same dimensions, which load both faces of the piezoelectric plate, as shown in FIG. 5. The n-th plate is characterized using the expression:

$$\begin{bmatrix} F_{1,n} \\ F_{2,n} \end{bmatrix} = \begin{bmatrix} AR_n\frac{Z_n^2+e^{-2\alpha_n}}{Z_n^2-e^{-2\alpha_n}} & 2AR_n\frac{Z_n e^{-\alpha_n}}{Z_n^2-e^{-2\alpha_n}} \\ 2AR_n\frac{Z_n e^{-\alpha_n}}{Z_n^2-e^{-2\alpha_n}} & AR_n\frac{Z_n^2+e^{-2\alpha_n}}{Z_n^2-e^{-2\alpha_n}} \end{bmatrix} \begin{bmatrix} U_{1,n} \\ U_{2,n} \end{bmatrix}, \quad (2)$$

where $Z_n$ is the time shift operator $e^{jT_n}$; $T_n$ is the one-way transit time for the n-th plate; $R_n$ is the specific acoustic impedance for the n-th plate; $F_{1,n}$, $F_{2,n}$ are the force variables for the n-th plate; $U_{1,n}$, $U_{2,n}$ are the velocity variables for the n-th plate; and $\alpha_n$ is the one-way loss for the n-th plate (which may be a function of frequency).

Figure 6:
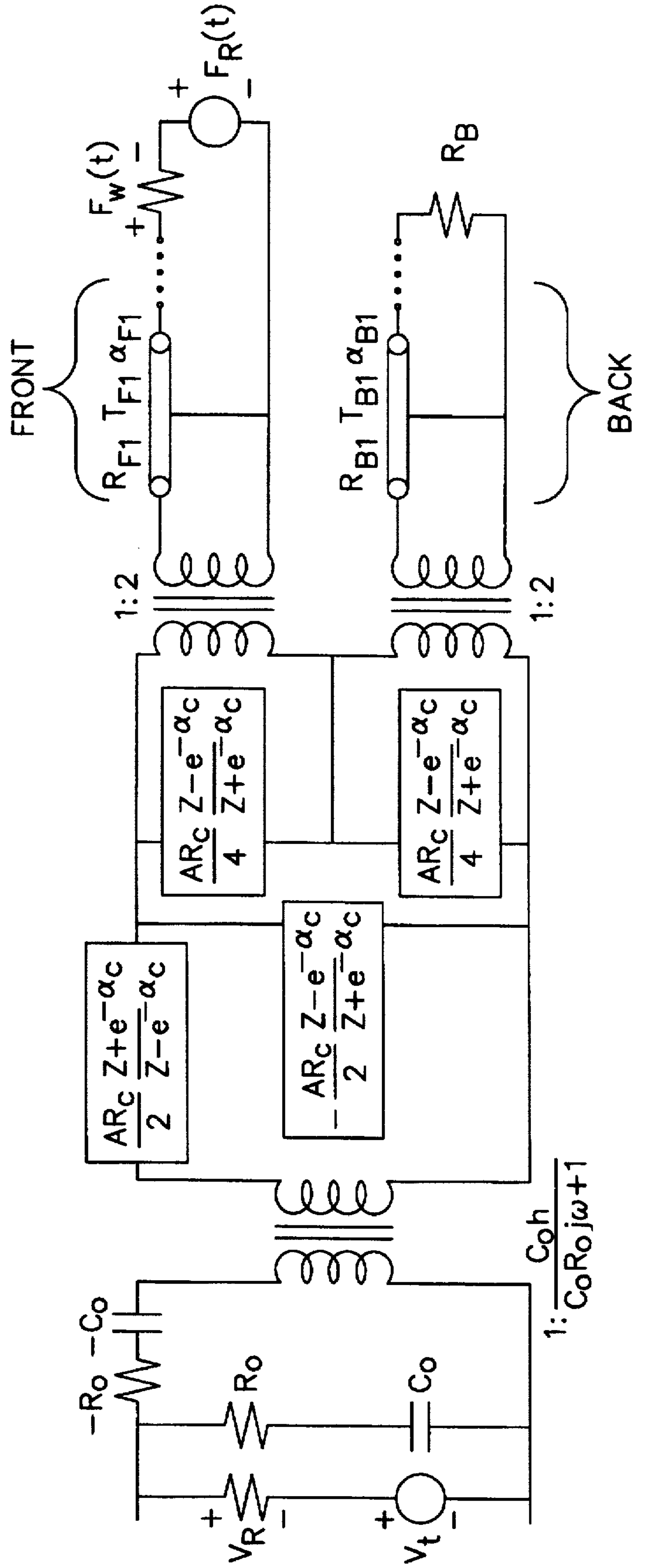
FIG. 6 is a schematic showing a lumped element model which is the circuit equivalent of the electromechanical model shown in FIG. 5.

For most practical transducers, the plates connected to the front face represent matching layers, bond lines and metal layers and terminate in a radiation impedance $R_W$. Plates connected to-the back face represent similar layers that terminate in a backing impedance $R_B$. The overall electromechanical model is given in FIG. 6, with multiple two-port networks characterized by Eq. (2) connected to the front and back mechanical ports. Similarly, electrical components terminating in a transmitting source are connected to the electrical terminals.

The one-way transmission transfer function will be considered as the radiated force over the transmitter source as given in:

$$H_T(j\omega)=\frac{F_W(j\omega)}{V_T(j\omega)}. \quad (3)$$

Similarly, the one-way reception transfer function is the received voltage divided by the wave force, as in:

$$H_R(j\omega)=\frac{V_R(j\omega)}{F_R(j\omega)}. \quad (4)$$

Since the transducer is a linear passive reciprocal device, the two transfer functions are identical functions of frequency with the exception of a scaling constant. The product of these two functions, times a factor of two representing force doubling for a wave reflected from a stiff boundary (which conserves the energy of the acoustic wave), is the loop gain of the transducer. The transfer functions may be readily evaluated using the familiar methods outlined in the Appendix.

The transfer function of Eq. (3) is a function of the various parameters of the acoustic and electrical networks. The objective of the design method of the present invention is to specify the parameters of the various acoustic and electrical elements so that a desired transfer function is achieved. This is done by selecting a "target function" and then manipulating the various transducer parameters so as to approximate this target function. The error between $H_T(j\omega_n)$ and the target function $T(j\omega_n)$ is defined to be:

$$E=\frac{1}{N}\sum_{n=0}^{N-1}|20\log|H_T(j\omega_n,\vec{P})|-20\log|T(j\omega_n)||. \quad (5)$$

where the error E is the average absolute difference between the transfer and target functions evaluated in decibels, summed over N points in frequency. Computer optimization is then applied to minimize the error E by manipulating the physical parameters of the acoustic layers, the piezoelectric plate and the electrical network, which are denoted as the elements of parameter vector P. For the optimization disclosed herein, the thicknesses and impedances of the matching plates plus the thickness of the piezoelectric plate will be used. If the error is made sufficiently small over a significant bandwidth, then the target function is said to have been synthesized.

There are numerous methods of computer minimization of Eq. (5) subject to a target function T(jω) and achieved by manipulating the elements of vector P. The preferred method is the gradient search. This method can be used to manipulate the parameter elements to achieve a minimization of E. The difficulty arises in picking the target function T(jω), so that a good match to the target function results. The selection of suitable target functions, leading to optimal design, is achieved by considering insertion loss filter theory and certain physical constraints of the transducer.

The transducer design problem may be viewed as an electrical filter design. Specifically, the reactive elements of the electrical network, the piezoelectric plate and the acoustic plates are "inserted" as low-loss or zero-loss reactive elements between an electrical generator with a characteristic impedance $R_T$ and a radiation load with a characteristic impedance $R_W$. The problem is somewhat complicated here by the addition of a third port, to which the backing acoustic network plus backing load are connected. However, many of the well-known properties of electrical filter theory may be readily applied to the transducer problem. Of particular significance are the properties of energy transmission, loss in the filter's reactive elements and reciprocity. It is useful to examine the general filter properties of the lumped element transducer model.

Figure 7A:
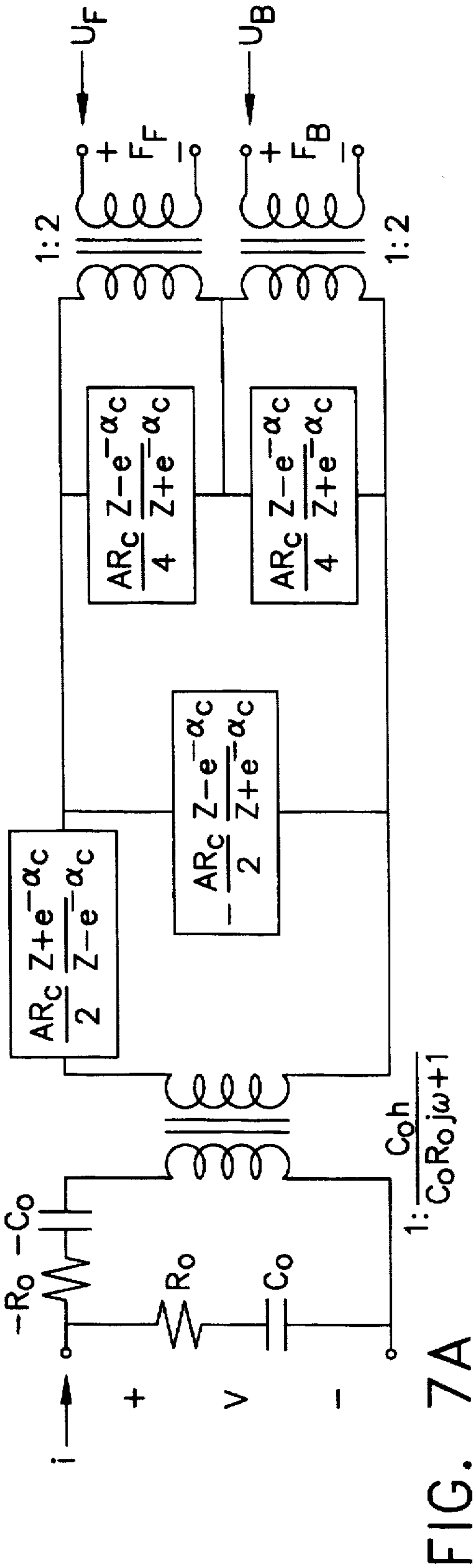
FIG. 7A is a schematic showing an exact lumped element model of the piezoelectric plate.

The lumped element model is a circuit equivalent to the Mason model with certain lumped elements connected in a configuration shown in FIG. 7A. The model is identical with that of the Rhyne reference with the addition of the loss elements given above. Since this circuit achieves the same terminal relationships as the Mason model, it is totally equivalent. However, this model emphasizes the serial connection of the front and back ports.

Figure 7B:
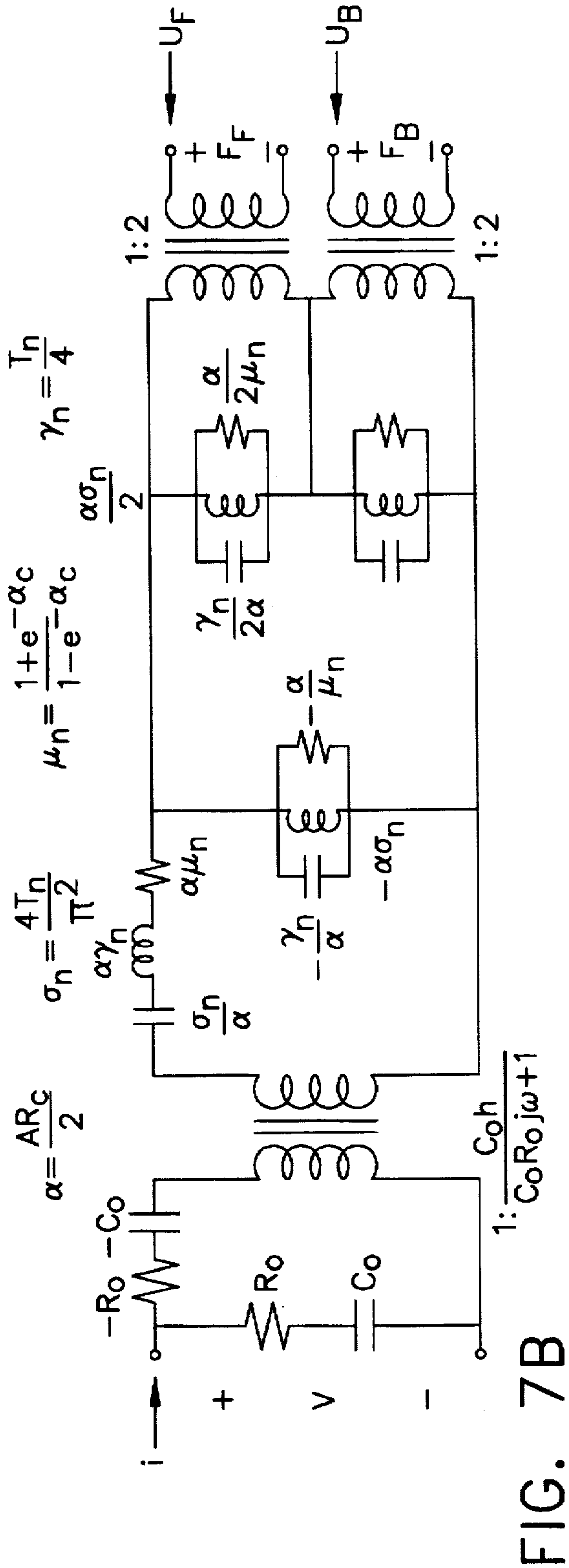
FIG. 7B is a schematic showing the lumped element model of FIG. 7A with the exact lumped elements of FIG. 7A approximated by simple RLC resonators.

The lumped element model of FIG. 7A can be used to examine the general transfer properties of the transducer, as approximated by a lumped element RLC filter. To accomplish this, the exact lumped elements of FIG. 7A are approximated by simple RLC resonators, resulting in the model of FIG. 7B and using the relationships included therein. The series resonator is the principal series connection carrying energy across the filter, while the parallel resonators act as unwanted shunting reactances with high impedance. For a first-order modeling approximation, the parallel resonators are ignored. Similarly, there are an infinite number of additional resonators at harmonic frequencies, which will also be ignored. Finally, if the losses of the lumped elements are small, then the transducer can be approximated as a purely reactive insertion-loss filter between the transmitter source and the radiation load of the front plus the series connected backing load of the back. Consequently, as a first-order modeling approach, the transducer will be viewed as a simple bandpass filter, valid over some bandwidth centered about the half-wave resonance of the piezoelectric plate. The properties of this simple model are used to infer design approaches, which are then exactly analyzed using the analysis methods of the Appendix.

As a design guide, it is important to note that simple, intuitive circuit models can be constructed which are exactly valid at certain special frequencies. At the resonance frequency of the series resonator, the impedance of the resonator equals its loss resistance (minus the dielectric loss resistor), which is relatively small, so that this lumped element becomes a short. Also, at this frequency the parallel resonators exhibit very high impedance and become open circuits. Consequently, the reactive elements vanish and the transmitter source is seen to be directly connected to the front and back ports via the transformers of the model. From this simple resistive network, significant transfer properties can be seen by inspection as discussed in the Rhyne reference.

Figure 8:
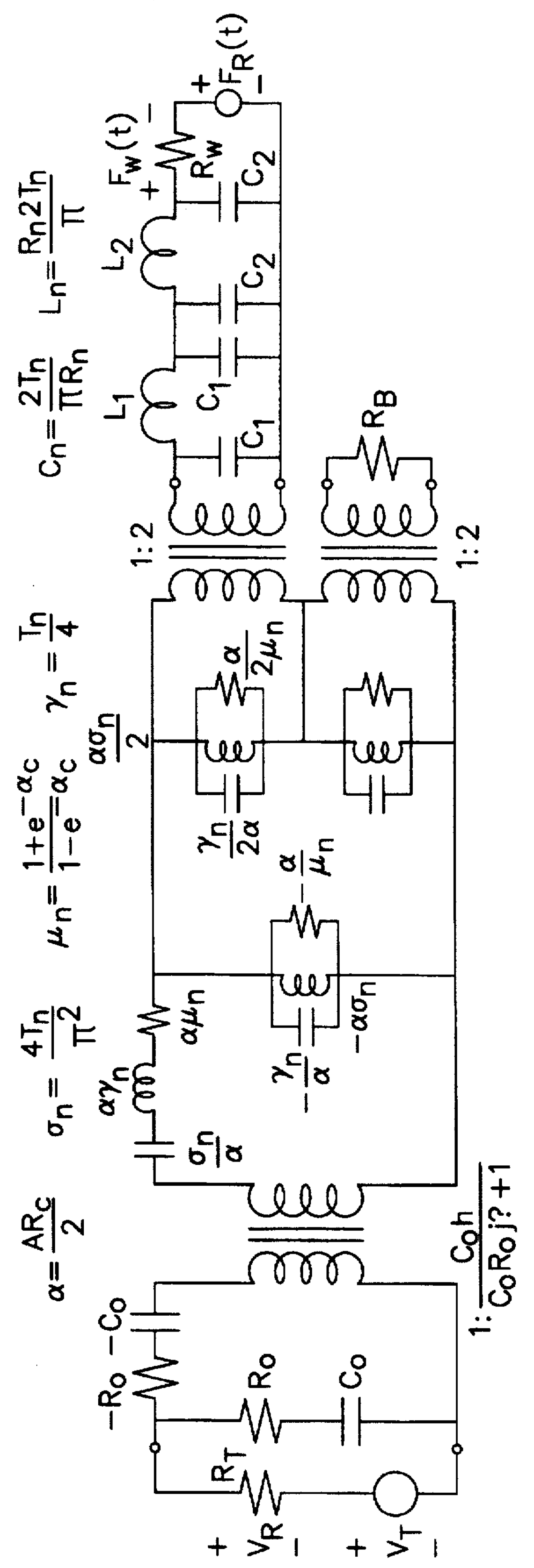
FIG. 8 is a schematic showing a complete lumped element insertion loss model with the matching plates each approximated by lumped LC networks using a pi network. Two such matching plates are represented.

The transducer configuration of interest contains two matching plates making up the front network, and a simple backing loss, preferably of very low impedance. The matching plates can be approximated with lumped LC networks using a pair of pi networks in cascade. Combining this with the previous model, a complete lumped element insertion loss model is constructed in FIG. 8. On inspection, this filter appears to be that of a three-pole bandpass filter. The series resonator of the piezoelectric layer forms the principal bandpass mechanism, while a pair of pi networks, representing the matching plates, each add a resonance. In general, if there are N matching plates, then there should be N+1 poles in the transfer function. Also, it is well known that the matching plates act as transformers at their quarter wave frequency. Consequently, using the single frequency method above, the radiation load is transformed up in impedance scale so that it becomes more significant than the series-connected backing load. The exact bandpass properties can be readily confirmed by evaluating the transfer function $H_T(j\omega)$ using the analysis methods of the Appendix.

A synthesis method for the design of transducer dynamics can now be defined. Transducers with N matching plates are considered, which function as an N or N+1 pole insertion-loss filter, having low-loss reactive components. Next, the target dynamics $T(j\omega)$ are selected using polynomials of the order N or N+1, which are centered on the desired frequency. Finally, an optimization algorithm adjusts the parameters of the transducer, P, so as to place the poles of the transfer function in a manner that achieves the given polynomial target function. The optimization uses the exact analysis of the transducer dynamics.

Appendix

Mason's model is given in Eq. (1) with mechanical and electrical loads defined in FIG. 5 and in Eq. (2). The mechanical loads consist of multiple layers of acoustic plates, defined in Eq. (2), which terminate in a radiation or backing resistance representing a half-space. The mechanical two-port mode of Eq. (2) is analogous to a short-circuit impedance matrix, if force is analogous to voltage and velocity is analogous to current. Using these analogies, standard electrical circuit analysis methods may be directly applied to arrive at the transfer functions of Eqs. (3) and (4).

The mechanical two-port model defined in Eq. (2) can be converted into a so-called ABCD matrix by the familiar manipulations given in the following:

$$\begin{bmatrix} F_{n1} \\ U_{n1} \end{bmatrix} = \begin{bmatrix} A & B \\ C & D \end{bmatrix} \begin{bmatrix} F_{n2} \\ -U_{n2} \end{bmatrix} = \begin{bmatrix} \dfrac{Z_n^2 + e^{-2\alpha_n}}{2Z_n e^{-\alpha_n}} & AR_n \dfrac{Z_n^2 - e^{-2\alpha_n}}{2Z_n e^{-\alpha_n}} \\ \dfrac{Z_n^2 - e^{-2\alpha_n}}{AR_n 2Z_n e^{-\alpha_n}} & AR_n \dfrac{Z_n^2 + e^{-2\alpha_n}}{2Z_n e^{-\alpha_n}} \end{bmatrix} \begin{bmatrix} F_{n2} \\ -U_{n2} \end{bmatrix} \tag{6}$$

where the short-circuit impedance matrix equation [Eq. (2)] has been transformed into a matrix equation that relates the force and velocity at terminal pair 1 to the force and velocity at terminal pair 2 for layer n, with the obvious subscript notations shown. Using simple computer calculations, the matrix form of Eq. (6) may be multiplied (the so-called chain rule) for each of the layers on the front or back face of the piezoelectric plate resulting in 2 by 2 matrices that interconnect the piezoelectric plate with its respective radiation and backing loads. A similar analysis may be made using suitable ABCD matrices for various electrical components, and which results in a 2 by 2 electrical matrix that interconnects the electrical terminal pair with the source load impedance.

Having arrived at three ABCD matrices, each representing a two-port model, for the two mechanical and electrical networks, the desired transfer functions are arrived at by inverting the ABCD matrices back to the analog of short-circuit impedance matrices and combining them with the Mason model of Eq. (1), as follows. First, Eq. (7) is used to convert the ABCD matrices, where "F" denotes the front network and similar conversions are made for the back and electrical networks, as in:

$$\begin{bmatrix} F_{F1} \\ F_{F1} \end{bmatrix} = \begin{bmatrix} \dfrac{A}{C} & \dfrac{AD-BC}{C} \\ \dfrac{1}{C} & \dfrac{D}{C} \end{bmatrix} \begin{bmatrix} U_{F1} \\ U_{F2} \end{bmatrix} = \begin{bmatrix} G_{F11} & G_{F12} \\ G_{F21} & G_{F22} \end{bmatrix} \begin{bmatrix} U_{F1} \\ U_{F2} \end{bmatrix} \tag{7}$$

These new matrices are in the short-circuit impedance matrix form. The Mason model of Eq. (1) is restated as a generic matrix in:

$$\begin{bmatrix} F_1 \\ F_2 \\ V \end{bmatrix} = \begin{bmatrix} B_{11} & B_{12} & B_{13} \\ B_{21} & B_{22} & B_{23} \\ B_{31} & B_{32} & B_{33} \end{bmatrix} \begin{bmatrix} U_1 \\ U_2 \\ i \end{bmatrix}, \quad (8)$$

The "front" network will be connected to the $F_1$ and $U_1$ terminals, while the "back" network will be connected to the $F_2$ and $U_2$ terminals.

The connection of the front terminal pair $F_{F1}$ and $U_{F1}$ to $F_1$ and $U_1$ can be analyzed using the analogy of a voltage loop which involves summing $F_1$ and $-F_{F1}$ to zero while equating $U_1$ with $-U_{F1}$. The back network is connected in a similar fashion, and radiation and backing loads $AR_W$ and $AR_B$ are added. The resulting formulation is given in:

$$\begin{bmatrix} F_{F1} \\ F_1 \\ F_2 \\ F_{B1} \\ V \end{bmatrix} = \begin{bmatrix} G_{F22}+AR_W & -G_{F21} & 0 & 0 & 0 \\ -G_{F12} & G_{F11}+B_{11} & B_{12} & 0 & B_{13} \\ 0 & B_{21} & B_{22}+G_{B11} & -G_{B12} & B_{23} \\ 0 & 0 & -G_{B21} & G_{B22}+AR_B & 0 \\ 0 & B_{31} & B_{32} & 0 & B_{33} \end{bmatrix} \begin{bmatrix} U_{F2} \\ U_1 \\ U_2 \\ U_{B2} \\ i \end{bmatrix} \quad (9)$$

The desired transfer function $H_T(j)$ may be evaluated by inverting the matrix to solve for the U and i vector as a function of the F and V vector. This means that velocity $U_{F2}(j\omega)$ will be solved as a function of voltage $V(j\omega)$. Multiplication by $AR_W$ gives the desired transfer. The equations can be solved numerically for discrete values of frequency and a discrete Fourier transform constructed. The transient response may be evaluated from the inverse of the Fourier transform. Note that if the substitution of $S=a+j\omega$ is made for $j\omega$, then the numerical value of the Laplace transform may be obtained for suitable root finding in the complex plane. Also, more general radiation and backing impedances may be used in place of the simple resistances used in this analysis.

The formulation here emphasizes the Fourier transform and the radian frequency $\omega$. It is important to remember that loss in these materials is often frequency dependent. Consequently, applying such a loss, with its frequency dependence, may be accomplished by directly inserting the desired function into the evaluation of the Fourier transform given here.

The series resonance of the piezoelectric layer of a beam-shaped resonator is useful in interpreting the "tuning" of the piezoelectric layer. The series or free resonance is given by solving the implicit relation in:

$$F_s = \frac{K_T^2 F_p 2}{\pi} \left[ \tan\left( \pi \frac{F_p - F_s}{F_p} \right) \right]^{-1} \quad (10)$$

for $F_s$ using a computer algorithm. Note that the parallel resonance $F_p$ is the half-wave resonance of the plate.

I claim:

1. A method for manufacturing an ultrasonic transducer having:

a layer of backing material;

a layer of piezoelectric material acoustically coupled to said layer of backing material;

a layer of first acoustic matching material acoustically coupled to said layer of piezoelectric material; and a layer of second acoustic matching material acoustically coupled to said layer of first acoustic matching material, said method comprising the steps of:

creating a design space having first and second axes, said first axis having a dimension of fractional bandwidth and said second axis having a dimension of band shape;

synthesizing a plurality of transducer designs for a corresponding plurality of points in said design space using the fractional bandwidth and band shape values for each point;

plotting goodness-of-fit error values for each of said plurality of points;

drawing a contour representing points having a predetermined error level such that design points on one side of said contour have an unacceptable error and design points on the other side of said contour have an acceptable error;

selecting a target transfer function corresponding to a design point on said other side of said contour; and adjusting the properties of said layers of said ultrasonic transducer to achieve said target transfer function by minimizing the error of fit, wherein said adjusting step comprises the steps of selecting a first impedance and a first thickness of said layer of first acoustic matching material, a second impedance and a second thickness of said second acoustic matching material, and a third thickness of said layer of piezoelectric material so that the transfer function of said transducer is a Transitional Butterworth-Thompson transfer function;

forming said layer of first acoustic matching material having said first impedance and said first thickness;

forming said layer of second acoustic matching material having said second impedance and said second thickness;

forming said layer of piezoelectric material having said third thickness;

bonding said layer of first acoustic matching material to a front face of said piezoelectric layer;

bonding said layer of second acoustic matching material to said layer of first acoustic matching material; and bonding said layer of backing material to a rear face of said piezoelectric layer.

2. The method as defined in claim 1, wherein said adjusting step is performed by computer optimization.

3. The method as defined in claim 2, wherein said computer optimization utilizes a steepest descent gradient search algorithm.

4. The method as defined in claim 1, wherein the scale of said band shape dimension is a parameter M which varies from zero for a Butterworth transfer function to unity for a Bessel transfer function.

* * * * *